Aug. 25, 1936.   A. E. BRANDON   2,051,817
MOTOR VEHICLE SIGNAL LAMP
Filed Feb. 18, 1935
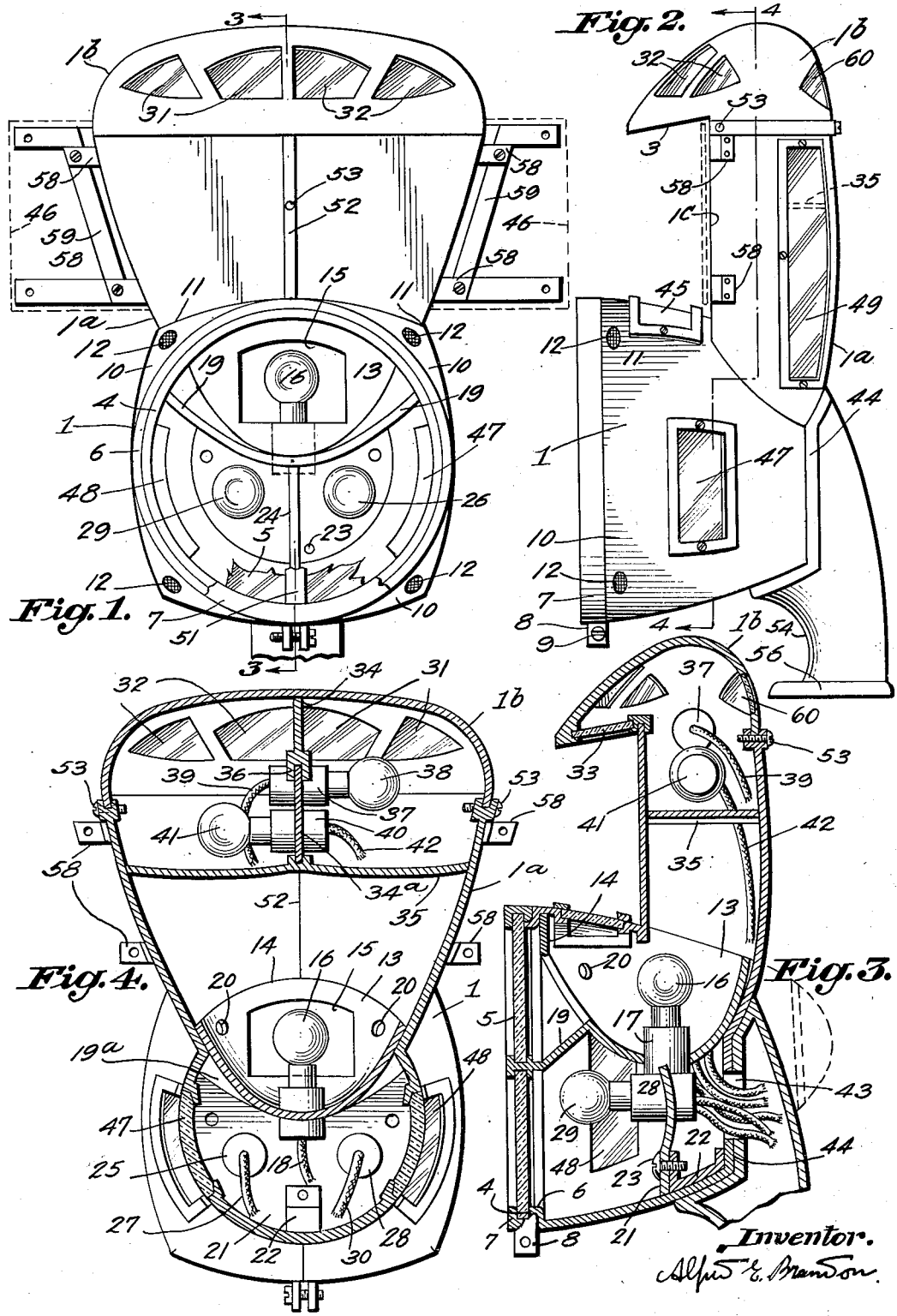

Patented Aug. 25, 1936

2,051,817

UNITED STATES PATENT OFFICE 2,051,817

MOTOR VEHICLE SIGNAL LAMP

Alfred Eduard Brandon, New York, N. Y.

Application February 18, 1935, Serial No. 7,055

3 Claims. (Cl. 177—329)

My invention relates to improvements in motor vehicle signal lamps, more particular of the type used on automobiles, in which warning signals combined with means to throw beams of light laterally as well as against a vehicle; and the objects of the improvement are:

First: to incorporate all the usual signals in a novel casing or structure and having improved means to project beams in any desired direction laterally as well as against a vehicle equipped with the invention.

Second, to provide a novel arrangement of the usual warning signals in the said structure cooperative with one another, so as to attract the attention of drivers of vehicles or other persons more readily and effectively.

Third, to provide a novel arrangement of light indicators, closely associated with the usual signals, so as to increase the warning effects.

Fourth, to provide a novel arrangement of colored lenses in the structure to reduce the danger of sideward approaches.

Fifth, to afford facilities for the proper mounting of a vehicle license plate against the casing or structure whereby; first—the usual beams of light thrown thereon are fully intercepted and intensified thereon; second—other beams of light from signals, other than the first or usual, are also thrown thereon to substitute when the first or usual signal source of light is out of order; third—vibration, rattling, misalignment and possible loss of license plates encountered with the usual arm or brackets is eliminated.

Sixth, to provide a novel arrangement of a plurality of beams against the vehicle, whereby the surfaces thereof, normally illuminated from one signal source of light, are further illuminated by beams from other signal sources of light, thereby insuring safety in traveling for motorist.

Seventh, to provide a signal lamp of the character described, adapted for use at the rear as well as the fore of automobiles or other vehicles without impairing the structure and reliability of said signals respectively, and which is also attractive in design.

One form of the invention is illustrated in the accompanying drawing, in which

Figure 1 is a front elevational view of the lamp, its front lens and rim being substantially broken off to show the interior thereof.

Figure 2 is a side elevational view of the lamp.

Figure 3 is a vertical sectional view on the line 3—3 of Fig. 1.

Figure 4 is a vertical sectional view on the line 4—4 of Fig. 2.

Illustrated is a casing having a lower or horizontal parabolic chamber 1, joining a vertical parabolic chamber 1a, to which is secured a detachable parabolic cap 1b.

This vertical chamber fore wall is about parallel with its longitudinal axis and is shown for sake of simpilcity flat; and serves, interiorly, to reflect beams rearwardly of the casing or structure, while exteriorly, is arranged for mounting a vehicle license plate, referred to hereinafter.

The parabolic cap 1b open end projects forward of the said fore wall and is arranged to receive a plane portion 3, preferably inclined as shown. Said portion 3 may be flat or curved and, if so desired be made one piece with the cap.

The lower chamber open front is provided with an inner flange 4, adapted to seat a lens 5. And 6 is an impressed band around said flange to receive a split rim 7, having lugs 8, adapted to receive a screw or bolt 9, to secure the lens and rim in place.

10 are parabolic reflecting portions depressed from the parabolic surface of the chamber 1, and arranged around the open front thereof, and their fore wall being on the edge of said front converging rearward in a manner whereby apices 11 laterally of the lower chamber are constituted. The portions 10 function to project beams laterally as well as rearwardly of the casing or structure, and also intensify the light within each signal chamber and upon the lenses thereat.

12 are light lenses or indicators, preferably mounted in each fore wall of the portions 10, and they are visible forwardly and laterally of the casing or structure, are rendered luminous from the usual bulb of the signals, referred to hereinafter, and are thus effective to prevent accidents.

In said lower chamber is a parabolic reflector 13, having a portion 14 fitted against the inner side of the flange 4 (see Fig. 3), and an opening 15 for passage of light onto the front lens. It is obvious that the reflector 13 forms the central parabolic portion of the vertical chamber 1a and tends to project rays upwardly, while the portion 14 directs the rays rearwardly.

Disposed in the reflector is the usual tail or parking bulb 16 in the usual socket 17 with wire 18 in the manner indicated.

19 is an exterior curved parabolic portion of the reflector 13 with the outer edge against the front lens to confine the light, projected through the opening 15, on a desired portion of said lens, while the undersurface, marked 19a, functions the same as the portion 14 of the reflector stated above.

20 are openings formed in the reflector for passage of light onto the aligned indicators.

21 is a second reflector, secured to lugs 22 provided with threads, adapted to receive screws 23. It is obvious that the reflector 21 forms the parabolic central portion of the lower chamber and in this manner enables the rear portion of the chamber 1 to conceal the parts illustrated and referred to hereinafter. And a vertical plane portion 24 extended from the second reflector to and against the front lens forms two separate compartments. One serves for the stop signal with the usual socket 25, for the bulb 26, and wire 27. And the other serves for the reverse or backing signal with socket 28, bulb 29, and wire 30. These sockets are preferably secured in the second reflector, but may be in the portion 24 if desired.

In the fore wall of the cap 1b are mounted arrow shaped lenses 31 and 32 for left and right turn warnings. These lenses conform to the contour of said cap, and each may be constructed of one piece, or in two portions as shown. And in the underside or plane portion 3 is mounted a lens 33, referred to hereinafter.

34 is a vertical partition with the lower end against a horizontal 35, constituted thereby two separate compartments in the upper portion of the casing or structure. Because the parabolic cap, preferably, is detachable, said vertical partition is constructed in two pieces 34 and 34a, joined at 36 interlocks.

One of the latter compartments is provided with a socket 37, bulb 38 and wire 39, and functions as the left direction signal; while the other is provided with a socket 40, bulb 41, and wire 42, for the right signal. As can be seen, the sockets 37 and 40 are preferably secured in the portion 34a; although if so desired they may be secured in said horizontal portion 35. It will be noted in Fig. 4, that said partition 35 is curved so as to project the rays centrally upward; and in Fig. 3 it is shown for sake of simplicity horizontal, but same can be disposed at an inclined angle sufficiently to project from the under surface beams rearwardly of the casing or structure.

The wires 39 and 42 extend downward to the other wires 18, 27 and 30 in the rear of the second reflector, and together are passed through an opening 43, formed in the closed end 44 of the chamber to their independent circuit connections respectively.

Around the casing or structure are light transmitting openings, each of which adapted to receive a lens conforming to the casing curvature thereat. And if it is desired to have the casing or structure, for instance, at the rear left of the automobile; said lenses are:

Lens 45, plain, adapted for passage of the usual beam thrown against the license plate, marked 46 and shown in dotted lines in Figs. 1 and 2.

Lens 47, plain, for transmitting of a beam against the rear surfaces of the automobile.

Lens 48, colored, for warning from the left of said automobile.

Lens 49, plain, for transmitting another beam against the same rear surfaces downwardly, substantially in the same direction as the first. It is obvious that the beam will cross the one thrown from lens 47; and thereby intensify and increase the luminous surfaces, and is thus effective especially at night to prevent accident and insure safety in traveling for motorist.

The lens 5 being in three pieces, each of which conforms to the open front of the signal compartments respectively, and are held together by means of a connecting portion 51, secured in the rim 7.

It will be noted that the present casing or structure is constructed, apart from the cap 1b, in two vertical half portions with joints 52 interlocking, and may be further secured by means of screws 53.

The arm or bracket 54, through which the usual wires of the signals pass, is at one end arranged to receive portion 44, and secured together by any suitable means. The other end 56 represents the usual means for securing said bracket on the vehicle.

58 are lugs disposed at the vertical chamber, serving and arranged as a means to receive said vehicle license plate. In Fig. 1, is shown extension brackets 59, secured at the right and left of the casing at the lugs; and they are only used when it is desired to support the license plate against the outer edge; or when the license plate is not at centre with the casing or beam thrown against it, one extension bracket may be used at the side where the most projection of the license plate is. It is of course understood that other means may be employed to receive and secure said plates.

In Figs. 2 and 3 is shown a lens 60 in the rear of the parabolic cap for transmitting beams from bulbs 38 and 41 against the vehicle respectively; and are preferably arrow shaped for right and left turn warnings, conveniently seen by drivers approaching opposite one another.

With the parts assembled, illustrated and described above:

The tail or parking bulb 16 operates from the usual main switch; and the directed rays therefrom are transmitted through opening 15 upon the lens 5; through openings 20, 20 upon the upper indicators 12, 12; through lens 45 against the license plate 46, through lens 49 against the wall of the vehicle.

The stop signal bulb 26 operates from the usual operation of the foot brakes. And the directed rays therefrom are transmitted upon the portion of the lens in the fore thereof and also one indicator; also through lens 47 upon the said wall.

Signal bulb 29 operates from any suitable device for reverse. And the directed rays therefrom will illuminate portion of the lens in the fore thereof and one indicator; and lens 48.

Left turn signal bulb 38 operates from the usual steering post. And the directed rays therefrom are transmitted through lenses 31—31; through lens 33 against license plate 46; through lens 60 against said wall.

The right turn signal bulb 41 operates from said device. And the directed rays therefrom are transmitted through lenses 32—32, through lens 33 against said license plate; through lenses 49 and 60 against said wall of the vehicle.

It is apparent, that the beams from the direction signals thrown against the vehicle are vertical to the others thrown also thereagainst; also that the beams from the direction signals upon the license plate may substitute especially at night while parking the vehicle and the parking or tail light being out of order; also that beams from bulb 16 thrown against the license plate are intercepted on the underside of portion 3 of the cap and deflected therefrom against said license plate and the road bed.

It is further apparent, that whenever a bulb is on, a portion of the vehicle body is instantaneously illuminated together with the other warning means of the respective signal; and is due to the arrangement of the bulbs and cooperative lenses, both of which shall be interpreted as illustrative disposed in the casing and not in a limited sense.

It is understood, that I could instead of one lens 33 in the portion 3 of the casing for both turn signals employ a separate lens for each.

Also, eliminate the portion 3 by simply terminating the fore portion of the cap and disposed direction lenses therein.

Also, as an extra tail lamp, eliminate the upper or vertical portion of the casing, and restore the parabolic central portion of the horizontal chamber and dispose centrally therein a lens to produce light against the vehicle, as indicated in dotted lines of Fig. 3.

It is obvious that the invention may be embodied in many forms and construction within the scope of the claims, and I wish it to be understood that the particular form shown is but one of the many forms. Various modifications and changes being possible, I do not otherwise limit myself in any way with respect thereto.

And I claim as new:

1. In combination, a vehicle light casing having light transmitting openings in the rear and on the top, means for mounting a license plate adjacent said top opening, so as to be illuminated by light therefrom, a light in said casing, a reflector for said light, normally obscuring said rear opening and directing the light through the top opening to illuminate the license plate, and an opening in said reflector in alignment with the rear opening to permit transmission of light through said rear opening.

2. The combination as set forth in claim 1, including a direction signal casing positioned above said means for mounting the license plate, a signal light therein, direction signal openings in the rear of the casing, a light transmitting opening in the bottom of the casing, whereby when said light is operated to illuminate the signal openings, said light will illuminate the license plate.

3. The combination, a vehicle light casing having light transmitting openings in the rear and in a side, means for mounting the license plate adjacent said side opening, so as to be illuminated by light therefrom, a light in said casing, a reflector for said light, normally obscuring said rear opening and directing the light through the side opening to illuminate the license plate, an opening in said reflector in alignment with the rear opening to permit transmission of light through said rear opening, a direction signal casing positioned adjacent said means for mounting the license plate, signal lights therein, direction signal openings in the rear of the signal casing, and another light transmitting opening adjacent the license plate mounting in the signal casing, whereby when said lights are operated to illuminate the signal openings, said lights independently will illuminate the license plate.

ALFRED E. BRANDON.